United States Patent
Lewis et al.

(10) Patent No.: US 9,311,168 B1
(45) Date of Patent: Apr. 12, 2016

(54) DEEPLINKING TO MULTIPLE NATIVE APPLICATIONS

(71) Applicant: Google Inc., Mountain View, CA (US)

(72) Inventors: Justin Lewis, Marina del Rey, CA (US); Ruxandra Georgiana Davies, Santa Monica, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 14/871,100

(22) Filed: Sep. 30, 2015

(51) Int. Cl.
 *G06F 3/00* (2006.01)
 *G06F 9/44* (2006.01)
 *G06F 9/46* (2006.01)
 *G06F 13/00* (2006.01)
 *G06F 9/54* (2006.01)

(52) U.S. Cl.
 CPC ........................................ *G06F 9/54* (2013.01)

(58) Field of Classification Search
 None
 See application file for complete search history.

(56) References Cited

U.S. PATENT DOCUMENTS

| 2008/0134049 | A1 | 6/2008 | Gupta et al. |
| 2012/0124061 | A1 | 5/2012 | Macbeth et al. |
| 2014/0108373 | A1 | 4/2014 | Abrahami et al. |
| 2015/0156061 | A1* | 6/2015 | Saxena ................ G06F 9/44 715/733 |

FOREIGN PATENT DOCUMENTS

| WO | WO 2005/057349 | 6/2005 |
| WO | WO 2015/084554 | 6/2015 |

* cited by examiner

*Primary Examiner* — Craig Dorais
(74) *Attorney, Agent, or Firm* — Fish & Richardson P.C.

(57) ABSTRACT

Methods, systems, and apparatus, including computer programs encoded on computer storage media, for obtaining data specifying a plurality of native applications for a particular resource; generating, for each of the native applications, a respective corresponding deeplink for the native application, wherein selection of the respective deeplink causes the native application to display a display environment comprising the particular resource; ranking the respective deeplinks based on a respective rank score for each native application to which the respective deeplink corresponds; and generating metadata that associates the respective deeplinks and their corresponding rankings with the particular resource.

9 Claims, 3 Drawing Sheets

DEEPLINKING TO MULTIPLE NATIVE APPLICATIONS

BACKGROUND

The Internet provides access to a wide variety of information. For example, digital image files, video and/or audio files, as well as web page resources for particular subjects or particular news articles, are accessible over the Internet. With respect to web page resources, many of these resources are designed to facilitate the performing of particular functions, such as banking, booking hotel reservations, shopping, etc., or to provide structured information, such as on-line encyclopedias, movie databases, etc. Search engines crawl and index these resources to facilitate searching of the resources.

Furthermore, with the advent of tablet computers and smart phones, native applications that facilitate the performance of the same functions facilitated by the use of web page resources are now being provided in large numbers. Additionally, native applications that do not have corresponding websites with similar content, such as games, are also very popular on tablet computers and smart phones. Accordingly, search engines now also facilitate searching of these native applications.

One process by which search engines gather information for native applications is by accessing "deeplinks" for native applications. A deeplink is an instruction specifying a particular environment instance of a native application and configured to cause the native application to instantiate the environment instance of the specified native application when selected at a user device. The native application generates the environment instance for display within the native application on a user device. For example, a deeplink may be a URI that specifies a particular native application, resource content that the native application is to access, and a particular user interface that should be instantiated when the native application is launched by use of the deeplink. For example, a deeplink may specify a selection menu for a game environment; or a particular selection of a song for a music application; or a particular recipe for a cooking application; and the like.

Publishers of content now provide native applications as a means of consuming their content. Some publishers provide multiple different native applications for presenting the same content, and some content can be presented by native applications published by multiple different publishers.

SUMMARY

In general, this specification describes a system for deeplinking to multiple native applications.

In general, one innovative aspect of the subject matter described in this specification can be embodied in methods that includes the actions of obtaining data specifying a plurality of native applications for a particular resource; generating, for each of the native applications, a respective corresponding deeplink for the native application, wherein selection of the respective deeplink causes the native application to display a display environment comprising the particular resource; ranking the respective deeplinks based on a respective rank score for each native application to which the respective deeplink corresponds; and generating metadata that associates the respective deeplinks and their corresponding rankings with the particular resource.

Another innovative aspect includes receiving, at a user device, first user input interacting with a link referencing a resource; in response to the first user input, obtaining metadata associated with the link, wherein the metadata comprises a ranked list of deeplinks, wherein each deeplink specifies a native application and causes a corresponding native application to display a display environment comprising the resource, the ranked list of deeplinks specifies a respective ranking for each native application within the ranked list; determining, from the ranked list of deeplinks, one or more native applications specified by the deeplinks are installed on the user device; and causing a native application, from the one or more native applications, determined to be installed on the user device and having a highest rank among the one or more native applications to display a display environment comprising the resource.

Particular embodiments of the subject matter described in this specification can be implemented so as to realize one or more of the following advantages. Some native applications provide better user experiences than others based on the type of resource presented in the native application. This is often due to publishers of the content tailoring the content to a particular native application. For example, a video serving website may also provide multiple native applications for consuming video. Each native application may be tailored to a particular audience—e.g., one native application for children, another native application for sports fans, and a third native application for general consumption. While the same video content may be displayed in each of the native applications, the publisher may prefer, for example, that content for children be displayed in the native application for children; content for sports be displayed in the native application for sports; and so on. For a particular resource, the system provides multiple deeplinks, each linking to a respective native application, so that when a user interacts with a link referencing the particular resource on a device, the particular resource is presented in a native application that is installed on the device and that provides a highest ranked user experience for presenting the particular resource. Therefore, the system automatically redirects users to view or interact with the resource within the native application without requiring the user to manually determine and load a particular application in which to present the resource. This simplifies the user experience.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
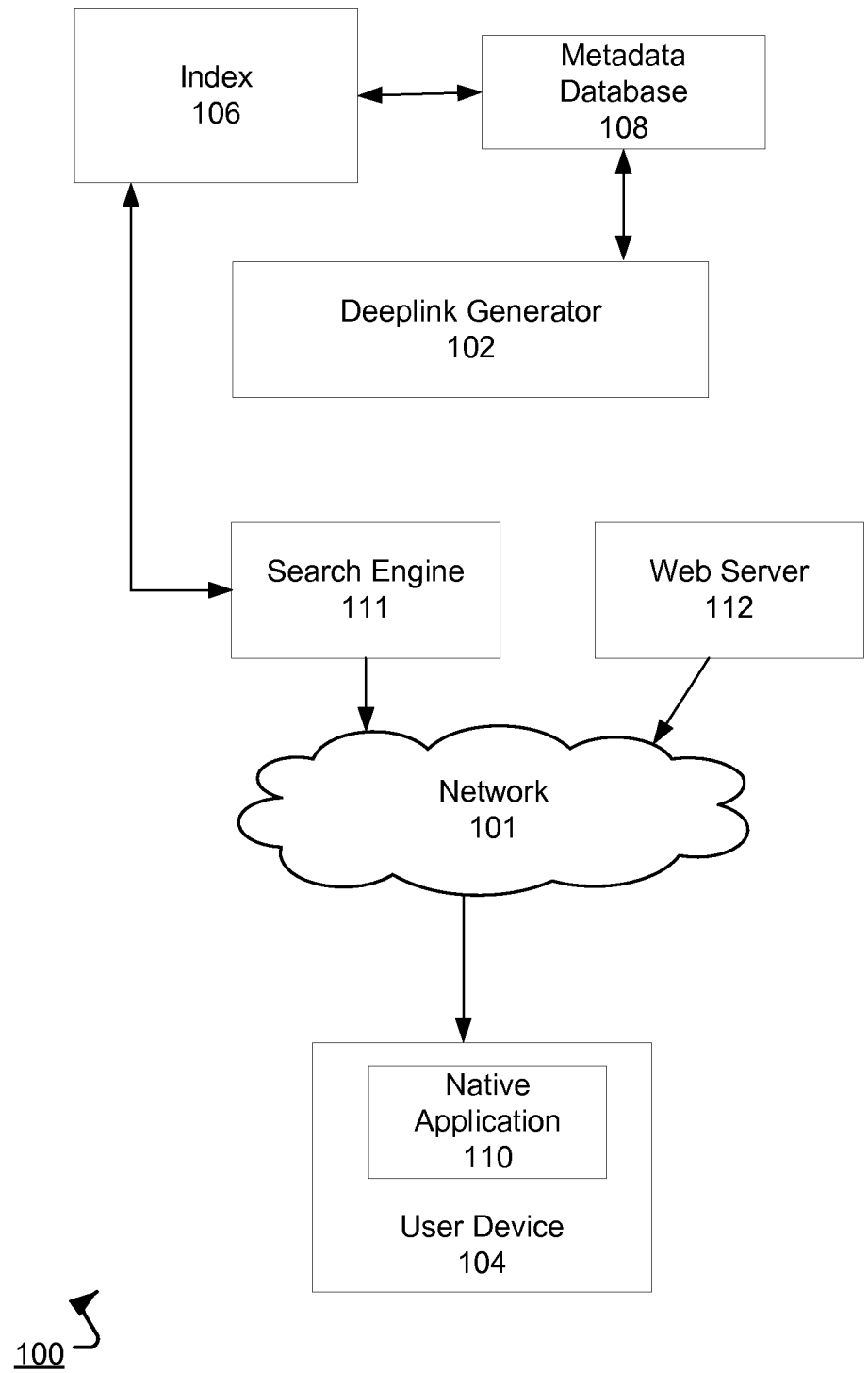
FIG. 1 illustrates an example system for generating multiple deeplinks to multiple native applications for a particular resource.

FIG. 1 illustrates an example system 100 for generating multiple deeplinks for a particular resource. Each deeplink links to a native application. As used herein, a native application, e.g., native application 110, generates application pages for display on a user device, e.g., user device 104, within an environment of the native application, and operates independently of a browser application on the user device. A native application is an application specifically designed to run on a particular user device operating system and machine firmware, and differ from web browser applications in that they are not necessarily designed to process multiple different resources conforming to a particular hypertext markup language standard.

The resource can be associated with multiple deeplinks. That is, each of the deeplinks can cause the resource to be displayed in a respective native application display environment. Each native application display environment can provide a unique user experience for viewing or interacting with the resource. The multiple deep links may be provided and specified by the publisher of the content, or, alternatively, may be determined by a search engine that indexes native applications.

A resource is content that is addressable and accessible by a device. A resource may be a web page, or a video file or stream, an audio file or stream, a document, a database, or other entity accessible by a uniform resource locator (URL). The resource can be indexed in an index 106. The index 106 is an index of resources that has, for example, been built from crawling web sites and native applications. Thus, the index may index web pages and native applications, and include URLs for web pages, and deeplinks in the form of URIs for content of native applications.

The resource can also be associated with metadata. The metadata can include a type of genre that the resource is classified under. The resource can be classified by a genre classification system. Example genres include kids, movies, or games. Typically a genre or genres for a resource are specified by a publisher of the resource. However, the genre can also be determined by a third party. In some implementations, the metadata for the resource specifies native applications that can access or display the resource. Example native applications include "YouTube Kids", "YouTube Games", or "YouTube Music." The metadata can be stored in a metadata database 108. Again, the metadata can be specified by the publisher, or determined by the third party.

The system 100 includes a deeplink generator 102 that generates multiple deeplinks for the resource. In some implementations, the generated deeplinks are stored in the metadata associated with the resource, i.e., the metadata database 108. The deeplink generator 102 receives the metadata from the metadata database 108 and processes the metadata for the resource to generate the multiple deeplinks. The deeplink generator 102 will be described further below with reference to FIG. 2.

The index 106 is searchable by a search engine 111. The search engine can combine web resource search results that reference web resources that can be rendered in a browser application on a user device, and native application search results that specify the native application. The native application search results are generated, in part, in response to a search of the index 105.

The user device 104 submits a search query to the search engine 111. In response to query, the search engine 110 accesses the index 106 identify content of resources and applications that are relevant to the query. The search engine 111 may, for example, identify the resources and applications in the form of web resource search results and native application search results, respectively. Once generated, the search results are provided to the user device 108 from which the query was received.

A web resource search result is data generated by the search engine 110 that identifies a web resource and provides information that satisfies a particular search query. A web resource search result for a resource can include a web page title, a snippet of text extracted from the resource, and a resource locator for the resource, e.g., the URL of a web page. A native application search result specifies a native application. A variety of functions can be invoked by the selection of an application search result. For example, selection of a native application search result may cause the native application to launch (if installed on the user device 108) and generate an instance of application page referenced in the application search result and that includes content that is relevant to the search query. Such a function is referred to as "deep linking" within the application search result.

When serving a native application search result, the search engine 111 may include metadata that includes the generated deeplinks for the content. The deeplinks describe an order of preference of native applications that may be used to present the content. For example, if three particular native applications—A1, A2 and A3—may be used to present a particular piece of content, the metadata may describe that application A2 is preferred over application A3, and application A3 is, in turn, preferred over application A1. A user device that has all three applications will thus launch application A2 if the deeplink is selected at the user device. Conversely, a user device that has only applications A1 and A3 installed will launch application A3 if the deeplink is selected at the user device.

Additionally, a web server 112 can serve the resource and can be in communication with the search engine 111 to receive and provide metadata with the resource. When serving the resource, the web server 112 can obtain the metadata, including the generated deeplinks, from the metadata database 108 via the search engine 111 and serve the resource along with the metadata to the user device 104.

For example, if the user device 104 requests a web page including a video resource, the web server 112 can serve the video resource and obtain the metadata, including the generated deeplinks, associated with the video resource. The web server 112 can serve the web page and attach the metadata in a header of the web page. For example, if the web page has a Hypertext Markup Language (HTML) format, the web server 112 can include the metadata within a <HEAD> tag of the web page.

In still other implementations, the web server 112 need not access the index 106 if the publisher has already specified deeplink preferences for native applications. Thus, when a user device receives the web page and selects a link the video resource, for example, the native application that is launched to present the video will be selected according to the metadata provided with the webpage and the native applications installed on the user device.

Figure 2:
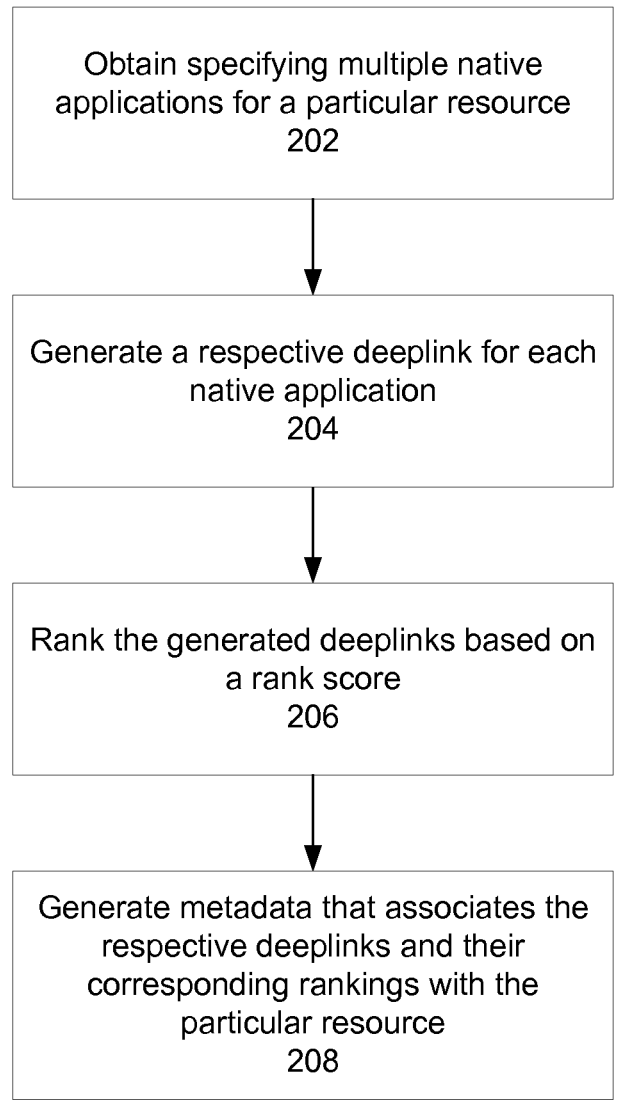
FIG. 2 is a flow diagram of an example method for generating multiple deeplinks for a particular resource.

FIG. 2 is a flow diagram of an example method 200 for generating multiple deeplinks for a particular resource. For convenience, the method 200 will be described with respect to a system, e.g., the deeplink generator 102 of FIG. 1, having one or more computing devices that execute software to implement the method 200.

The system obtains data specifying multiple native applications for a particular resource (step 202). The data can be obtained from a metadata database, e.g., the metadata database 108 of FIG. 1, or provided by a publisher of the resource. The specified native applications can be native applications that each instantiate a presentation environment unique to the native application and different from each other native application.

The system generates, for each of the native applications, a respective deeplink for the native application (step 204). The native application can be associated with a scheme name. The scheme name can be provided in a configuration file of the native application. The respective deeplink can include the scheme name for the native application in the form of a URL. The URL can include routing parameters, e.g., path and query strings, that represent custom actions to take in the native application. When the deeplink is selected at a user device, an operating system of the user device can process the URL to instantiate a display environment for the native application. The routing parameters can include an identifier of the resource so that the display environment for the native application displays the resource upon launch.

The system ranks the respective deeplinks based on a respective rank score for each native application to which the respective deeplink corresponds (step 206). Each native application can have a respective rank score. In some implementations, the rank score can be predetermined, e.g., stored in a rank score database. In other implementations, the rank score may be reflective of a preference list of the publisher of the resource. For example, for the three particular native applications—A1, A2 and A3—where application A2 is preferred over application A3, and application A3 is, in turn, preferred over application A1, the rank scores for applications A1, A2 and A3 may be 3, 1, and 2. The system can assign the respective rank score of the native application to the respective deeplink. In some implementations, the system generates a list of the deeplinks ordered by descending rank score.

The system generates metadata that associates the respective deeplinks and their corresponding rankings with the particular resource (step 208). That is, after generating the ranked list of deeplinks, the system can store the ranked list of deeplinks in the metadata. The metadata can then be stored in the metadata database.

As described above, once the metadata is generated, it may be associated with the resource and provided with a search result that references the resource or provided with a web page that includes a link to the resource.

In other implementations, the metadata may be provided when a user interacts with a link to the resource.

Figure 3:
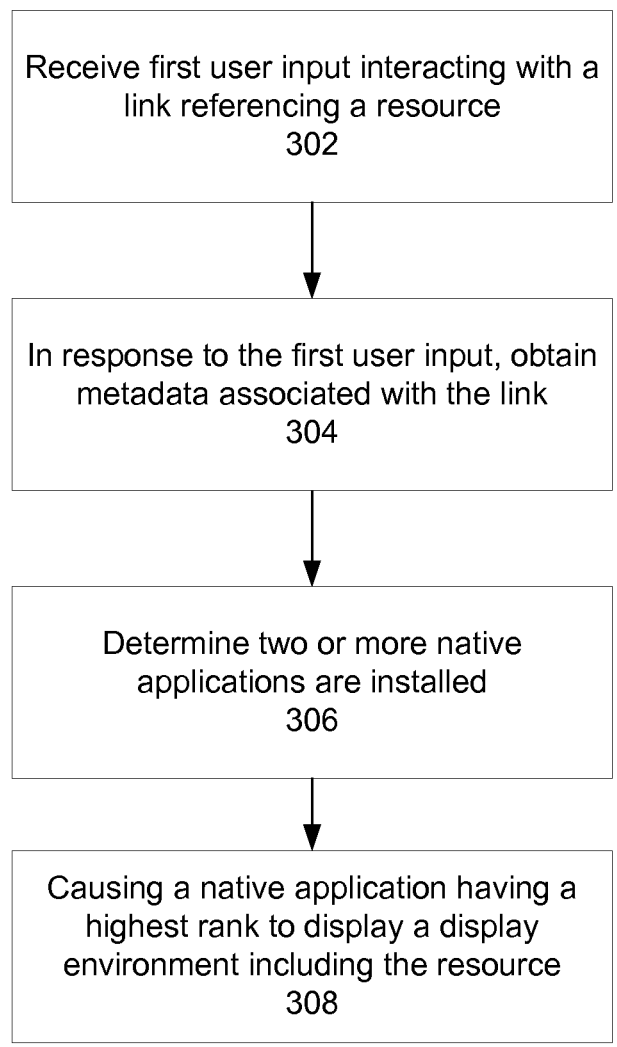
FIG. 3 is a flow diagram of an example method for processing the multiple deeplinks to display a resource in a native application.

FIG. 3 is a flow diagram of an example method 300 for processing the multiple deeplinks at a user device to display a resource. For convenience, the method 300 will be described with respect to a system, e.g., the user device 104 of FIG. 1, having one or more computing devices that execute software to implement the method 300.

The system receives first user input interacting with a link referencing a resource (step 302). The first user input can be a user tapping on the link at a display of the user device. The link can be displayed on a native application, e.g., a third party application, or a browser application. The application can receive the link by communicating with a third party server. The third party server can respond with content, which includes the link referencing the resource, to be displayed on the application. For example, the application can be a native social networking application, and the content can include a news feed of items. One of the items in the news feed can be the link referencing the resource.

In response to the first user input, the system obtains metadata associated with the link (step 304). The metadata includes the ranked list of deeplinks for the resource, e.g., the list of deeplinks described above with reference to FIG. 2. The metadata can be obtained from a cache stored by the native application, or can be obtained through a network call to a web server hosting the resource.

In some implementations, the metadata is cached by the third party server. For example, prior to receiving the first user input, another user device can submit the link referencing the resource to the third party server. The third party server can store the link referencing the resource for future access or display on other user devices. The third party server can also crawl the link to identify metadata of the resource. For example, the third party server can identify the metadata from a <HEAD> tag of a web page including the resource. The metadata can include the ranked list of deeplinks. The third party server can cache the metadata of the resource.

After the metadata is cached, the third party server can receive a request from the system, i.e., the user device, to display the link referencing the resource in the native application. The third party server can respond to the system with a response that includes the link and the cached metadata of the resource, which includes the ranked list of deeplinks.

The system, i.e., the user device, determines, from the ranked list of deeplinks in the metadata, that one or more native applications specified by the deeplinks are installed on the system (step 306). The system can determine whether a native application specified by a deeplink is installed by executing a particular operating system function with an identifier of the native application as an argument. The operating system function can return a Boolean specifying whether the native application is installed.

The system causes the native application determined to be installed on the user device and having a highest rank among the native applications determined to be installed on the user device to display a display environment including the resource (step 308). As described above with reference to FIG. 2, the native application with the highest rank has the highest rank score. Therefore, in one interaction, a user can, in a first application, select a deeplink for a particular resource, which causes the system to instantiate an environment in a second application, e.g., a native application that displays the resource.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory computer storage medium for execution by, or to control the operation of, data processing apparatus. The computer storage medium can be a machine-readable storage device, a machine-readable storage substrate, a random or serial access memory device, or a combination of one or more of them. The computer program may include multiple files, and may be deployed to execute one or more data processing apparatus.

The term "data processing apparatus" encompasses all kinds of apparatus, devices, and machines for processing data, including by way of example a programmable processor, a computer, special-purpose circuitry, or multiple processors or computers. The apparatus can also include, in addition to hardware, code that creates an execution environment for the computer program in question, e.g., code that constitutes processor firmware, a protocol stack, a database management system, an operating system, or a combination of one or more of them.

The processes and logic flows described in this specification can be performed by one or more programmable computers executing one or more computer programs to perform functions by operating on input data and generating output, or one or more special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by at least one data processing apparatus, comprising:
    obtaining data specifying a plurality of native applications for a particular resource, wherein:
        the particular resource includes content that is addressed and accessible by each native application of the plurality of native applications and the content can be presented by each native application of the plurality of native applications when the native application is selected to present the content of the resource; and
        each native application of the plurality of native applications for the particular resource is a native application that instantiates a presentation environment unique to the native application and that different from each of the other native applications of the plurality of native applications;
    generating, in response to the data specifying a plurality of native applications for the particular resource and for each of the native applications, a respective corresponding deeplink for the native application, wherein selection of the respective deeplink causes the native application to display a display environment in which the content of the particular resource is presented;
    ranking the respective deeplinks based on a respective rank score for each native application to which the respective deeplink corresponds to define an order of preference of the native applications for presenting the content of the particular resource, wherein a native application is selected by a user device according to the order of preference to present the content of the particular resource at the user device in response to a selection of the particular resource at the user device; and
    generating metadata that associates the respective deeplinks and their corresponding rankings with the particular resource.

2. The method of claim 1, further comprising providing to a user device form which a user query was received, the metadata associated with the particular resource in response to the user query for which the particular resource is identified in a search result as being responsive to the user query.

3. A method comprising:
    receiving, at a user device, first user input interacting with a link referencing a resource, wherein includes content that is addressed and accessible by each native application of the plurality of native applications and the content can be presented by each native application of the plurality of native applications when the native application is selected to present the content of the resource;
    in response to the first user input, obtaining metadata associated with the link, wherein the metadata comprises a ranked list of deeplinks, wherein each deeplink specifies one of the native applications of the plurality of native applications and causes the native application to display a display environment in which the content of the resource is presented, the ranked list of deeplinks specifies a respective ranking for each native application within the ranked list to define an order of preference of the native applications for presenting the content of the resource, wherein a native application is selected to present the content of the resource at a user device in response to a selection of the resource at a user device;
    determining, from the ranked list of deeplinks, two or more native applications specified by the deeplinks are installed on the user device; and
    causing a native application that is highest in the order of preference from the two or more native applications determined to be installed on the user device to instantiate and display a display environment and present the content of the resource in the display environment.

4. The method of claim 3, further comprising:
    prior to receiving the first user input, receiving, at a server, user input specifying the link referencing the resource;
    crawling, at the server, the link to identify the metadata of the resource; and
    caching, at the server, the metadata of the resource.

5. The method of claim 3, wherein determining native applications are installed on the user device comprises executing an operating system function that determines whether a particular native application is installed given an identifier for the particular native application.

6. The method of claim 3, wherein the metadata associated with the link is obtained from header data of a first resource in which the resource is displayed.

7. A system comprising:
    a processor; and
    computer-readable medium coupled to the processor and having instructions stored thereon, which, when executed by the processor, cause the processor to perform operations comprising:
    obtaining data specifying a plurality of native applications for a particular resource, wherein:
        the particular resource includes content that is addressed and accessible by each native application of the plurality of native applications and the content can be presented by each native application of the plurality of native applications when the native application is selected to present the content of the resource; and each native application of the plurality of native applications for the particular resource is a native application that instantiates a presentation environment unique to the native application and that different from each of the other native applications of the plurality of native applications;

generating, in response to the data specifying a plurality of native applications for the particular resource and for each of the native applications, a respective corresponding deeplink for the native application, wherein selection of the respective deeplink causes the native application to display a display environment in which the content of the particular resource is presented; comprising the particular resource;

ranking the respective deeplinks based on a respective rank score for each native application to which the respective deeplink corresponds to define an order of preference of the native applications for presenting the content of the particular resource, wherein a native application is selected by a user device according to the order of preference to present the content of the particular resource at the user device in response to a selection of the particular resource at the user device; and generating metadata that associates the respective deeplinks and their corresponding rankings with the particular resource.

8. A system comprising:

a processor; and computer-readable medium coupled to the processor and having instructions stored thereon, which, when executed by the processor, cause the processor to perform operations comprising:

receiving, at a user device, first user input interacting with a link referencing a resource, wherein the resource is accessible by each native application of a plurality of native applications and includes content that can be presented by each native application of the plurality of native applications;

in response to the first user input, obtaining metadata associated with the link, wherein the metadata comprises a ranked list of deeplinks, wherein each deeplink specifies one of the native applications of the plurality of native applications and causes the native application to display a display environment in which the content of the resource is presented, the ranked list of deeplinks specifies a respective ranking for each native application within the ranked list to define an order of preference of the native applications for presenting the content of the resource, wherein a native application is selected to present the content of the resource at a user device in response to a selection of the resource at a user device;

determining, from the ranked list of deeplinks, two or more native applications specified by the deeplinks are installed on the user device; and causing a native application that is highest in the order of preference from the two or more native applications determined to be installed on the user device to instantiate and display a display environment and present the content of the resource in the display environment.

9. The method of claim 1, wherein:

obtaining data specifying a plurality of native applications for a particular resource comprises receiving, from a publisher of the resource, a list that defines the native applications and an ordinal ranks score for each native application that defines an order of preference of the native applications for presenting the content of the particular resource; and ranking the respective deeplinks based on a respective rank score for each native application to which the respective deeplink corresponds comprises ranking the respective deeplinks based on the respective ordinal rank scores.

* * * * *